United States Patent
Lepp et al.

(10) Patent No.: US 10,833,892 B2
(45) Date of Patent: Nov. 10, 2020

(54) BRIDGED LOCAL AREA NETWORK COMMUNICATION BETWEEN A DEVICE AND A CELLULAR ACCESS NETWORK NODE

(71) Applicant: BLACKBERRY LIMITED, Waterloo (CA)

(72) Inventors: James Randolph Winter Lepp, Ontario (CA); Michael Peter Montemurro, Ontario (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 327 days.

(21) Appl. No.: 14/639,796

(22) Filed: Mar. 5, 2015

(65) Prior Publication Data

US 2016/0261430 A1 Sep. 8, 2016

(51) Int. Cl.
| | |
|---|---|
| *H04L 12/46* | (2006.01) |
| *H04W 16/14* | (2009.01) |
| *H04W 80/02* | (2009.01) |
| *H04W 76/15* | (2018.01) |
| *H04L 29/08* | (2006.01) |
| *H04W 88/16* | (2009.01) |
| *H04W 88/06* | (2009.01) |

(52) U.S. Cl.
CPC ......... *H04L 12/4641* (2013.01); *H04W 16/14* (2013.01); *H04W 80/02* (2013.01); *H04L 69/324* (2013.01); *H04W 76/15* (2018.02); *H04W 88/06* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,376,091 B1 | 5/2008 | Eccles | |
| 8,554,945 B1 | 10/2013 | Cook | |
| 9,426,649 B2 * | 8/2016 | Sirotkin | H04W 12/04 |
| 2003/0007517 A1 * | 1/2003 | Beckmann | H04B 7/2612 370/537 |
| 2009/0046659 A1 * | 2/2009 | Sebire | H04W 36/02 370/331 |
| 2013/0138823 A1 * | 5/2013 | Centemeri | H04W 76/022 709/228 |
| 2013/0242897 A1 * | 9/2013 | Meylan | H04W 28/16 370/329 |

(Continued)

FOREIGN PATENT DOCUMENTS

EP 2597925 5/2013

OTHER PUBLICATIONS

Eastlake, Donald, IEEE P802.11 Wireless LANs, Some 11ak Ethertype Frame Encoding Text, Mar. 2014, pp. 1-27.*

(Continued)

*Primary Examiner* — Huy D Vu
*Assistant Examiner* — Hong Shao
(74) *Attorney, Agent, or Firm* — Trop, Pruner & Hu, P.C.

(57) ABSTRACT

A bridge communicates a link layer frame between a device and a cellular access network node, the link layer frame comprising a portion including a header and data of an upper layer protocol layer instance in the device or the cellular access network node. The header includes identification information to identify which of a plurality of upper layer protocol layer instances the data is associated with.

17 Claims, 10 Drawing Sheets

(56) References Cited

U.S. PATENT DOCUMENTS

| | | | |
|---|---|---|---|
| 2014/0071907 A1* | 3/2014 | Roeland | H04W 76/021 370/329 |
| 2014/0204771 A1 | 7/2014 | Gao | |
| 2014/0204927 A1* | 7/2014 | Horn | H04W 76/16 370/338 |
| 2014/0269632 A1 | 9/2014 | Blankenship | |
| 2014/0287769 A1* | 9/2014 | Taori | H04W 74/0808 455/450 |
| 2015/0003435 A1* | 1/2015 | Horn | H04L 5/0058 370/338 |
| 2015/0264726 A1* | 9/2015 | Zhu | H04W 84/12 370/329 |
| 2015/0282026 A1* | 10/2015 | Gupta | H04W 12/02 370/331 |
| 2016/0013976 A1* | 1/2016 | Eastlake, III | H04L 47/32 370/236 |
| 2016/0128110 A1* | 5/2016 | Sirotkin | H04W 76/022 370/329 |
| 2016/0150058 A1* | 5/2016 | Wentink | H04L 69/22 370/474 |
| 2016/0156548 A1* | 6/2016 | Pazhyannur | H04W 28/08 370/338 |
| 2016/0198400 A1* | 7/2016 | Cho | H04W 8/08 370/328 |
| 2016/0234752 A1* | 8/2016 | Hsu | H04L 12/4641 |

OTHER PUBLICATIONS

Roy, Dick et al., EPD for IEEE 80211 5.9 GHz Operations, IEEE 802.11-14/1521r4, Jan. 14, 2015, pp. 1-17.*
Aruba Networks, White Paper—802.11AC In-Depth, 2014 (37 pages).
Vutukuri, U.S. Appl. No. 14/479,985, "Method and Apparatus for Simultaneous Use of Both Licensed and Unlicensed Wireless Spectrum"; filed Sep. 8, 2014, 59 pages.
Vutukuri, U.S. Appl. No. 14/480,022, "Method and Apparatus to Determine a Pseudo-Grant Size for Data to be Transmitted"; filed Sep. 8, 2014, 59 pages.
Barrett, U.S. Appl. No. 14/465,668, "Binding IEEE 802.11 MAC Frames to Logical Channels"; filed Aug. 21, 2014, 66 pages.
Vutukuri, U.S. Appl. No. 14/480,058; "Method and Apparatus for Authenticating a Network Entity Using Unlicensed Wireless Spectrum"; filed Sep. 8, 2014, 59 pages.
3GPP TS 24.302 V13.0.0; 3rd Generation Partnership Project; Technical Specification Group Core Network and Terminals; "Access to the 3GPP Evolved Packet Core (EPC) Via Non-3GPP Access Networks"; Stage 3, Release 13, Dec. 2014, 104 pages.
3GPP TS 36.322 V12.1.0; 3rd Generation Partnership Project; Technical Specification Group Radio Access Network; Evolved Universal Terrestrial Radio Access (E-UTRA); Radio Link Control (RLC) Protocol Specification; Release 12, Sep. 2014, 40 pages.
3GPP TS 36.323 V12.2.0; 3rd Generation Partnership Project; Technical Specification Group Radio Access Network; Evolved Universal Terrestrial Radio Access (E-UTRA); Packet Data Convergence Protocol (PDCP) Specification, Release 12; Dec. 2014, 30 pages.
IEEE P802.11 ak TM/D0.03; Draft Standard Telecommunications and Information Exchange Between Systems—Local and Metropolitan Area Networks; Part 11: Wireless LAN Medium Access Control (MAC) and Physical Layer (PHY) Specifications, Amendment <tbd>: Enhancements for Transit Links Within Bridged Networks; 2014, 49 pages.
IEEE P802.11-REVmcTM/D3.0, Draft Standard for Information Technology—Telecommunications and Information Exchange Between Systems; Local and Metropolitan Area Networks—Specific Requirements; Part 11: Wireless LAN Medium Access Control (MAC) and Physical Layer (PHY) Specifications; Jun. 2014, 3,701 pages.
IEEE P802.11-14/0826r4, Donald Eastlake, Huawei Technologies; Wireless LANs, Frame Type Encoding; Sep. 2014; 29 pages.
IEEE P802.11-14/1311r0; Donald Eastlake, Huawei Technologies; Wireless LANs, Sep. 25, 2014 Minutes, 10 pages.
IEEE, http://www.ieee802.org/1/pages/802.1ac.html, 802.1AC—Media Access Control (MAC) Services Definition, Sep. 22, 2005, 3 pages.
IEEE Standards Association; http://standards.ieee.org/findstds/standard/802.3-2012.html, IEEE Standard for Ethernet, 2012; 1 page.
IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2012, 2793 pages.
European Patent Office, International Search Report and Written Opinion for PCT/EP2016/054316 dated Jun. 7, 2016 (14 pages).
European Patent Office, Communication pursuant to Article 94(3) EPC for Appl. No. 16708113.2 dated Jan. 16, 2020 (5 pages).

* cited by examiner

BRIDGED LOCAL AREA NETWORK COMMUNICATION BETWEEN A DEVICE AND A CELLULAR ACCESS NETWORK NODE

BACKGROUND

Devices such as computers, handheld devices, or other types of devices can communicate over wired or wireless networks. Wireless networks can include cellular access networks that include cells and associated cellular access network nodes. A device within a cell can connect to a corresponding cellular access network node to allow the device to communicate with other devices.

Another type of wireless network is a wireless local area network (WLAN), which includes wireless access points to which devices are able to wirelessly connect.

BRIEF DESCRIPTION OF THE DRAWINGS

Some implementations of the present disclosure are described with respect to the following figures.

DETAILED DESCRIPTION

Bridged Local Area Network

Figure 1:
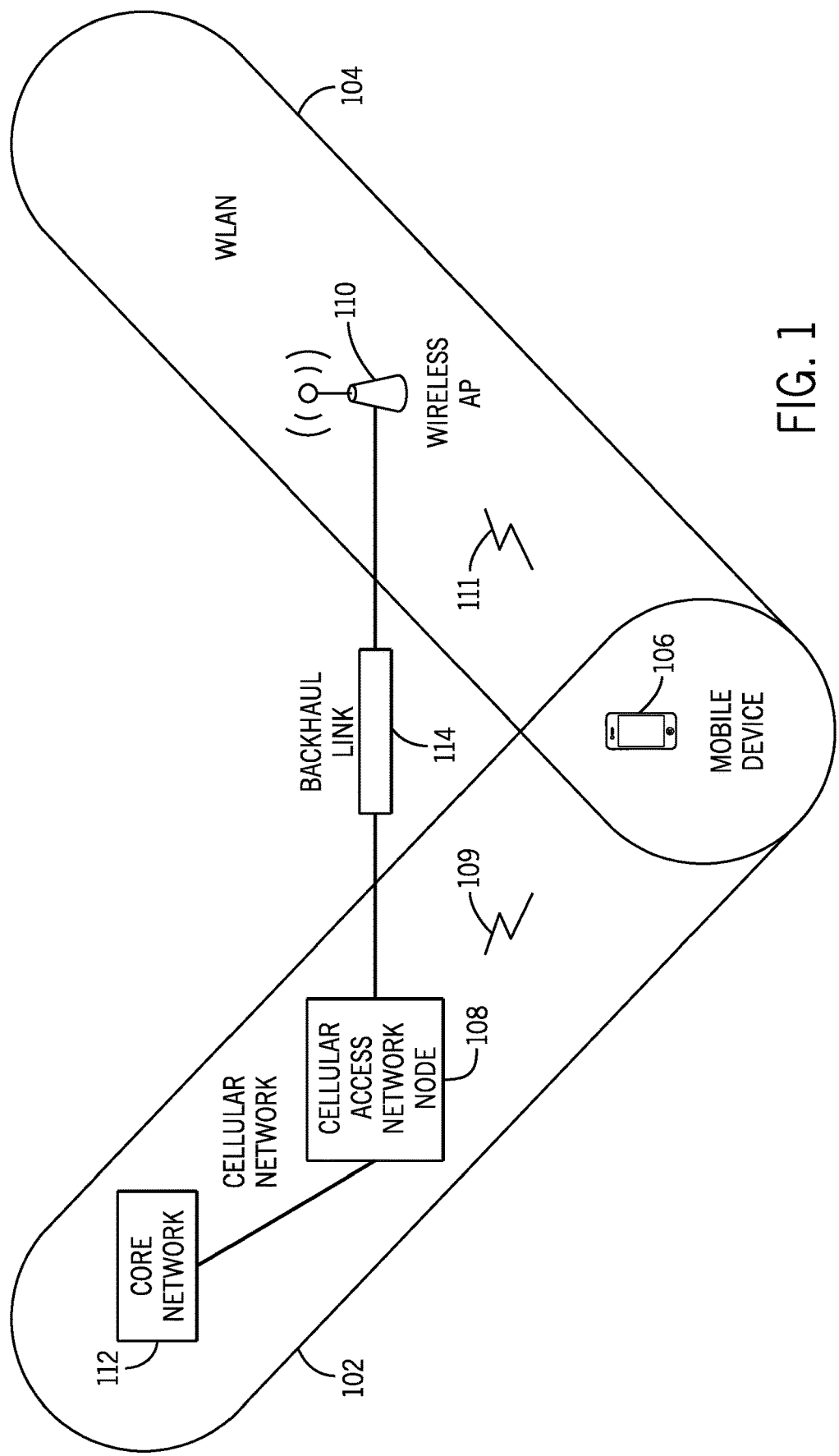
FIG. 1 is a block diagram of an example network arrangement that includes a cellular network and a wireless local area network (WLAN), which can implement a bridged local area network access to the cellular network, in accordance with some implementations.

FIG. 1 illustrates an example of a network arrangement that includes a cellular network 102 and a wireless local area network (WLAN) 104. FIG. 1 also shows a mobile device 106 that is at a location within the coverage area of both the cellular network 102 and the WLAN 104. The mobile device 106 can be a dual mode mobile device that is capable of communicating with different types of wireless access networks, which in the example of FIG. 1 include the cellular network 102 and the WLAN 104.

The cellular network 102 can operate according to the Long-Time Evolution (LTE) standards (or other standards) as provided by the Third Generation Partnership Project (3GPP). The LTE standards are also referred to as the Evolved Universal Terrestrial Radio Access (E-UTRA) standards. Although reference is made to LTE or E-UTRA in the ensuing discussion, it is noted that techniques or mechanisms according to some implementations can be applied to other wireless access technologies, such as 5G (fifth generation) technologies.

The cellular network 102 includes a cellular access network node 108, which is able to communicate wirelessly with the mobile device 106 over a cellular radio link 109. Although just one cellular access network node is depicted in FIG. 1, it is noted that the cellular network 102 can include multiple cellular access network nodes that correspond to respective cells of the cellular network 102. A cell can refer to the coverage area provided by a corresponding cellular access network node. Mobile devices can move between cells and connect to respective cellular access network nodes.

In an E-UTRA network, the cellular access network node 108 can be implemented as an enhanced Node B (eNB), which includes the functionalities of a base station and base station controller. In the ensuing discussion, the cellular access network node 108 is also interchangeably referred to as an eNB 108. Although reference is made to eNBs in the ensuing discussion, it is noted that techniques or mechanisms according to the present disclosure can be applied with other types of cellular access network nodes that operate according to other protocols.

The cellular network 102 also includes a core network 112, which includes various core network nodes. As examples, in an E-UTRA network, the core network nodes can include a serving gateway (SGW) and a packet data network gateway (PDN-GW). The SGW routes and forwards traffic data packets of a mobile device served by the SGW. The SGW can also act as a mobility anchor for a user plane during handover procedures. The SGW provides connectivity between the mobile device and an external network (such as a packet data network, e.g. the Internet or another network). The PDN-GW is the entry and egress point for data communicated between a mobile in the E-UTRA network and a network element coupled to a PDN (not shown).

In an E-UTRA network, the core network nodes can also include a control node referred to as a mobility management entity (MME). An MME is a control node for performing various control tasks associated with an E-UTRA network. For example, the MME can perform idle mode mobile device tracking and paging, bearer activation and deactivation, selection of a serving gateway) when a mobile device initially attaches to the E-UTRA network, handover of the UE between eNBs, authentication of a user, generation and allocation of a temporary identity to a mobile device, and so forth. In other examples, the MME can perform other or alternative tasks.

When connected to the cellular access network node 108, the mobile device 106 is able to communicate with other devices, which can be connected to the cellular network 102 or can be connected to other networks, including wired and/or wireless networks.

Although reference is made to mobile devices in the present discussion, it is noted that techniques or mechanisms according to some implementations of the present disclosure can be applied to other types of devices, including computers (e.g. desktop computers, notebook computers, tablet computers, server computers, etc.), handheld devices (e.g. personal digital assistants, smartphones, etc.), wearable devices that can be worn on a person, computers embedded in vehicles and appliances, storage devices, communication nodes, and so forth.

The WLAN 104 includes a wireless access point (AP) 110. The mobile device can communicate with the wireless AP 110 over a WLAN radio link 111. Although just one wireless AP is depicted in FIG. 1, it is noted that the WLAN 104 can include multiple wireless APs that provide respective coverage areas. In some implementations, the WLAN 104 can operate according to the Institute of Electrical and Electronics Engineers (IEEE) 802.11 standards. Note that the WLAN 104 that operates according to the 802.11 standards can also be referred to as a Wi-Fi network. In other examples, the WLAN 104 can operate to different standards. It is noted that IEEE 802.11 also supports direct communications between terminal devices, such as between mobile devices. Such direct communications (which do not pass through any APs) can be referred to as WLAN direct communications or Wi-Fi direct communications.

Cellular network operators that provide cellular networks in a licensed spectrum are running out of new spectrum to purchase, and the spectrum that is available can be costly to license. Thus cellular network operators are looking for ways to extend cellular networks to use unlicensed spectrum. An unlicensed spectrum includes frequencies that are not part of the licensed spectrum for a given cellular network. For example, LTE can be associated with a specific licensed spectrum that includes frequencies over which LTE communications can occur. An unlicensed spectrum includes frequencies outside the LTE licensed spectrum, e.g. frequencies currently used by an IEEE 802.11 WLAN.

A way to expand the capacity of a cellular network is to make use of both the licensed spectrum and an unlicensed spectrum. In some cases, this can be accomplished by connecting mobile devices using two different protocols to two different types of networks. However, if traffic data is aggregated in a core network (e.g. core network 112 in FIG. 1), high latency in switching traffic between the two networks can result. A fast offload is desired if the cellular network is congested and an opportunity is available. Also, a fast onload is desired if an unlicensed channel no longer provides sufficient service quality. Offloading refers to moving at least a portion of data communication from the cellular network 102 to a different network, such as the WLAN 104 of FIG. 1. Onloading refers to moving at least a portion of data communication from a different network, such as the WLAN 104, to the cellular network 102.

In accordance with some implementations, as shown in FIG. 1, a bridged local area network (LAN) is provided between the mobile device 106 and the cellular access network node 108 to allow the mobile device 106 to use the unlicensed spectrum associated with the WLAN 104 for data communications between the mobile device 106 and the core network 112 of the cellular network 102. The bridged LAN includes the WLAN 104 and a backhaul link 114 between the wireless AP 110 in the WLAN 104 and the cellular access network node 108. Although not shown, multiple wireless APs can be connected to the backhaul link 114. In some examples, the backhaul link 114 can be an Ethernet link (or more generally, a layer 2 network). The wireless AP 110 and cellular access network node 108 may be physically collocated or a long distance from each other. Thus the backhaul link 114 may be a long cable or wireless link or very short layer 2 connection.

It is noted that the mobile device 106 is also able to perform data communications over the cellular radio link 109 between the mobile device 106 and the cellular access network node 108. In some cases, the mobile device 106 is able to concurrently perform data communications with the cellular access network node 108 over both the cellular radio link 109 and the bridged LAN.

In some examples, the WLAN radio link 111 between the mobile device 106 and the wireless AP 110 is an IEEE 802.11 link (in implementations where the wireless AP 110 operates according to the IEEE 802.11 standards). In accordance with some implementations, the 802.11 link 111 uses IEEE 802.11ak EtherType Protocol Discrimination (EPD) encoding with a radio access technology (RAT) bridging protocol that allows frames to be transmitted transparently across the WLAN radio link 111 and the backhaul link 114 between the wireless AP 110 and the cellular access network node 108. A "frame" can refer to a unit of data for carrying information content. Frames according to different protocols can have different sizes.

IEEE 802.11ak refers to an amendment of the 802.11 standards to enhance 802.11 links for use in bridged networks. IEEE 802.11ak is also referred to as General Link (GLK).

EPD refers to a technique for identifying the protocol of content carried in a frame, where the first two octets of the frame is an EtherType field for identifying the protocol. Note that use of EPD also allows IEEE 802.1Q virtual local area network (VLAN) tags to be used to distinguish traffic communicated in different VLANs. IEEE 802.1Q is a networking standard that supports VLANs on an Ethernet network. A physical network, such as the WLAN 104, can be partitioned into multiple distinct domains, which are referred to as VLANs. Data communications in one VLAN can be isolated from data communications in another VLAN. Tags according to IEEE 802.1Q can be added to frames to identify respective VLANs that the frames are to be communicated in.

A technique for transporting bearer data (and more specifically, bearer data carried in radio bearers) between the core network 112 of the cellular network 102 and the mobile device 106 using an 802.11 radio link is referred to as tightly coupled interworking (TCIW). Bearer data can refer to user data (data communicated by a user of the mobile device 106) or application data (data communicated by an application executing on the mobile device 106). A radio bearer can refer to a channel established using radio resources of a cellular network for carrying information content, including bearer data and/or signaling.

In the uplink direction (from the mobile device 106 to the core network 112), in some examples, uplink bearer data is divided into frames in the mobile device 106, and these frames can either be sent using the cellular radio access technology (RAT) or the bridged RAT. In other examples, the uplink bearer data can be sent in one frame. In some cases all frames can be sent on one RAT or the other, but in other implementations frames from the same bearer may be sent on both RATs. The cellular RAT provides direct wireless communications of frames between the mobile device 106 and the cellular access network node 108 over the cellular radio link 109.

The bridged RAT provides indirect communications of frames between the mobile device 106 and the eNB 108 through the bridged LAN that includes the wireless AP 110 and the backhaul link 114. The eNB 108 assembles the frames received from either RAT and forwards the assembled frames as data to the core network 112. Communication of data between the mobile device 106 and the eNB 108 over the bridged LAN can be referred to communication of data according to the bridged RAT protocol.

In the downlink direction (from the core network 112 to the mobile device 106), the eNB 108 splits downlink bearer data (received from the core network 112) into frames and sends the frames using either the cellular RAT or the bridged RAT. At the mobile device 106, the frames received from one or more RATs are reassembled and passed as data to upper protocol layers in the mobile device 106.

Although reference is made to a bridged LAN access to a cellular access network node that is an eNB in the present disclosure, it is noted that the cellular access network node can be a different entity in other examples. For example, the cellular access network node can be a gateway to the cellular network.

Since the AP 110 is part of the bridged LAN to the cellular network 102, the AP 110 is also referred to as a "bridge" in the present disclosure. More generally, a bridge that is part of the bridged LAN can be a device that is able to wirelessly connect to a device to allow transport of data between the device and the cellular network through the network infrastructure of the bridged LAN.

In some implementations, for uplink and downlink bearer data, the bridged RAT can provide a VLAN that extends to the mobile device 106 over 802.11 ak.

Figure 2:
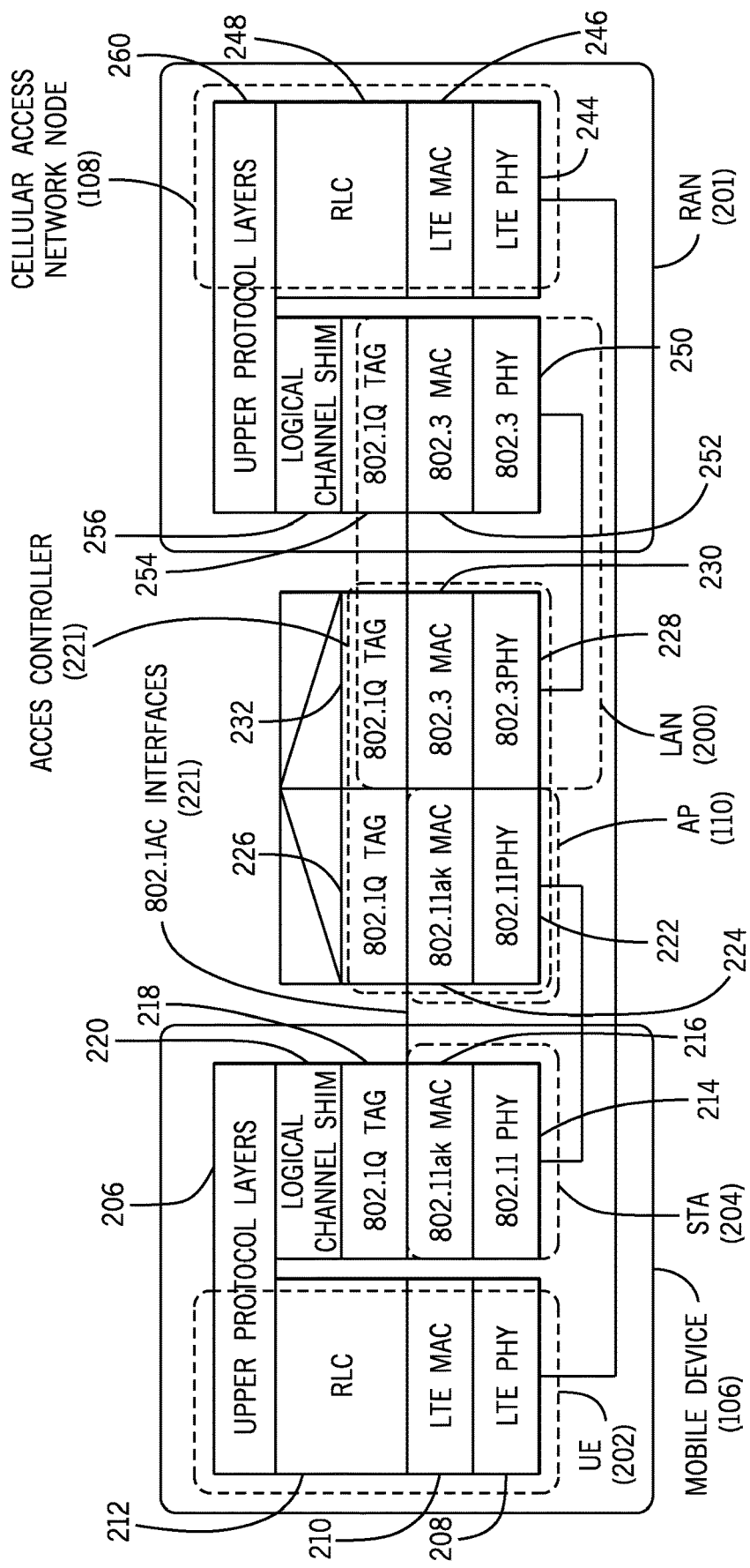
FIG. 2 is a schematic diagram showing various example protocol layers in a device, a wireless access point, and a cellular access network node, according to some implementations.

Although not shown in FIG. 2, it is noted that in further examples that the backhaul link 114 can include multiple network segments upon which the network bridge spans. Thus, there can be flexibility in the network topology of the backhaul link 114.

The connectivity between the mobile device 106 and the cellular network 102 is an EPD encoded Ethernet connection from end to end. The AP 110 is 802.11ak capable and the association between the mobile device 106 and the AP 110 is an EPD association. As noted above, the backhaul link 114 can be flexibly configured, such that the 802.1Q bridged cellular network connectivity can be made flexible.

The mobile device 106 transmits EPD encoded 802.11 frames to the AP 110, which deliver the frames to the eNB 108 over the backhaul link 114. The EPD encoded frames can traverse a fairly flexible set of network topologies including the 802.11 radio link 111. The AP 110 and the eNB 108 can be placed in the same physical location or can be placed far apart with various wireless links, Ethernet or carrier Ethernet networks in between.

FIG. 2 shows various protocol layers of the mobile device 106, the wireless AP 110, and a radio access network (RAN) 201. FIG. 2 also shows protocol layers of an LAN 200. Note that the protocol layers of the LAN 200 can be implemented in the wireless AP 110 and the RAN 201, in some implementations, or alternatively, can be implemented in a switch.

The mobile device 106 includes two or more protocol stacks, where a first protocol stack 202 is used for wireless communications between the mobile device 106 and the eNB 108 using the cellular RAT, and a second protocol stack 204 is used for communications through the bridged LAN to the cellular access network node 108. The first protocol stack 202 includes protocol layers in a dashed box marked "UE" in FIG. 2, which are the protocol layers that are present in a user equipment (UE) of an LTE network. The UE protocol stack 202 is used by the mobile device 106 to communicate with the cellular access network node 108 over the cellular radio link 109.

The second protocol stack 204 includes protocol layers in a dashed box marked "STA." A station (STA) is a device that has the capability to use the 802.11 protocol. An STA can refer to a terminal device or to an AP. The STA protocol stack 204 is used to communicate over the WLAN radio link 111 with the wireless AP 110.

The mobile device 106 also includes upper protocol layers 206, which can include a Packet Data Convergence Protocol (PDCP) layer or another upper protocol layer. An upper protocol layer can refer to a layer that is above a Medium Access Control (MAC) layer within a device, such as the mobile device 106 or a network node such as the eNB 108 or the wireless AP 110.

A PDCP layer can provide at least some of the following functionalities in the user plane, as described in 3GPP TS 36.323 (other functionalities not listed can also be performed by the PDCP layer):
  header compression and decompression;
  transfer of user data;
  in-sequence delivery of upper layer packed data units (PDUs);
  duplicate detection of lower layer service data units (SDUs);
  retransmission of PDCP SDUs; and
  ciphering and deciphering.

The UE protocol stack 202 includes an LTE physical layer 208, an LTE MAC layer 210, a LTE Radio Link Control (RLC) layer 212, and at least part of the upper protocol layers 206. Note that the RLC layer 212 can also be considered an upper protocol layer.

An RLC layer can provide at least some of the following example functionalities, as described in 3GPP TS 36.322 (other functionalities not listed can also be performed by the RLC layer):
  transfer of upper layer PDUs;
  error correction, such as by using Automatic Repeat reQuest (ARQ);
  concatenation, segmentation, and reassembly of RLC SDUs;
  reordering of RLC data PDUs;
  duplicate data detection;
  discarding of an RLC SDU;
  RLC re-establishment; and
  protocol error detection.

The STA protocol stack 204 includes an 802.11 physical layer 214 and an 802.11ak MAC layer 216.

In addition, an 802.1Q tag layer 218 and a logical channel shim layer 220 can be provided above the 802.11ak MAC layer 216. The 802.1Q tag layer 218 is able to add VLAN tags to frames for identifying respective VLANs.

In the mobile device 106, there can be multiple instances of an upper protocol layer. For example, there can be multiple instances of a PDCP layer, where the multiple PDCP layer instances are used to communicate data in respective different sessions or flows with one or more other end points. There can also be multiple RLC layer instances.

The upper protocol layer instances can also be referred to as logical channels. Data of a logical channel can be transmitted using either the cellular RAT or the bridged RAT. In some cases, a logical channel can be split and transmitted using both cellular RAT and bridged RAT. Such splitting the bearer data of electrical channels can be referred to as a bearer split. With the bearer split, the bearer data of the logical channel is split into a first subset of frames that are transmitted using the UE protocol stack 202, and a second subset of frames that are transmitted using the STA protocol stack 204.

As discussed further below, the logical channel shim layer 220 adds a wrapper header into an uplink frame to identify one of the logical channels, so that the frame can be delivered to the respective logical channel (or more specifically, the respective upper protocol layer instance) at the cellular access network node 108. In the downlink direction, the logical channel shim layer 220 can use a wrapper header in a downlink frame to identify a respective logical channel (or more specifically, the respective upper protocol layer instance) in the mobile device 106 that is the target of the downlink frame.

As further shown in FIG. 2, an access controller 221 includes both a wired and wireless network stack. In this example the wireless network stack is composed of an AP 110 which communicates with a STA 204 in mobile device 106. Also in this example the wired network stack is composed of a connection to LAN 200.

As further shown in FIG. 2, the wireless AP 110 includes an 802.11 physical layer 222 and an 802.11ak MAC layer 224. An 802.1Q tag layer 226 is provided above the 802.11ak MAC layer 224.

The LAN 200 can include parts of the wireless AP 110 that can include protocol layers to communicate over the LAN 200. These layers include an IEEE 802.3 physical layer 228, an 802.3 MAC layer 230, and an 802.1Q tag layer 232, which can be deployed in the wireless AP 110 or a switch.

The LAN 200 also includes protocol layers in the RAN 201, including an 802.3 physical layer 250, an 802.3 MAC layer 252, and an 802.1Q tag layer 254. The 802.3 physical layer 250, an 802.3 MAC layer 252, and an 802.1Q tag layer 254 allow the eNB 108 to communicate over the backhaul link 114 with the wireless AP 110. Above the 802.1Q tag layer 254 in the RAN 201 is a logical channel shim layer 256 that performs similar tasks as the logical channel shim layer 220 in the mobile device 106.

The RAN 201 (and more specifically the cellular access network node 108) also includes another protocol stack is to allow for communications over the cellular radio link 109 with the mobile device 106. This other protocol stack includes an LTE physical layer 244, an LTE MAC layer 246, and an RLC layer 248.

The cellular access network node 108 also includes upper protocol layers 260. As with the mobile device 106, multiple instances of each upper protocol layer can be present in the eNB 108. The multiple upper protocol layer instances can include PDCP layer instances, RLC layer instances, and/or other upper protocol layer instances.

As further shown in FIG. 2, IEEE 802.1AC compliant interfaces 221 are provided in each of the mobile device 106, wireless AP 110, LAN 200, and RAN 201 between the MAC layer and a respective 802.1Q tag layer. IEEE 802.1AC is a standard that defines the MAC Service within MAC Bridges. Provision of 802.1AC compliant interfaces 221 in the various nodes shown in FIG. 2 allows for IEEE 802.11 operations in a bridged mode in which a bridged LAN is provided between the mobile device 106 and the eNB 108. The WLAN 104 (802.11 network) can be used to transparently pass data between the mobile device 106 and the cellular access network node 108.

In some implementations of the present disclosure, the STA in the mobile device 106 is associated to the wireless AP 110 using a General Link (GLK) association. As noted above, GLK refers to IEEE 802.11ak.

Associating the STA in the mobile device 106 to the wireless AP 110 using GLK results in 802.11 MAC frames being EPD encoded instead of being Logical Link Control (LLC) encoded. By using EPD encoding, frames can be tagged using a bridging or VLAN protocol such as IEEE 802.1Q.

The use of the bridged LAN allows a frame to be transmitted from the mobile STA to a WLAN and carried by the WLAN to a destination without any change to the layer 2 payload of the frame. The EPD encoding of a WLAN frame allows seamless transport of data of an upper layer protocol via the wireless AP's frame forwarding function, which allows the upper layer protocol data to traverse the wireless AP 110 and arrive at the destination within the network without modification.

Figure 3:
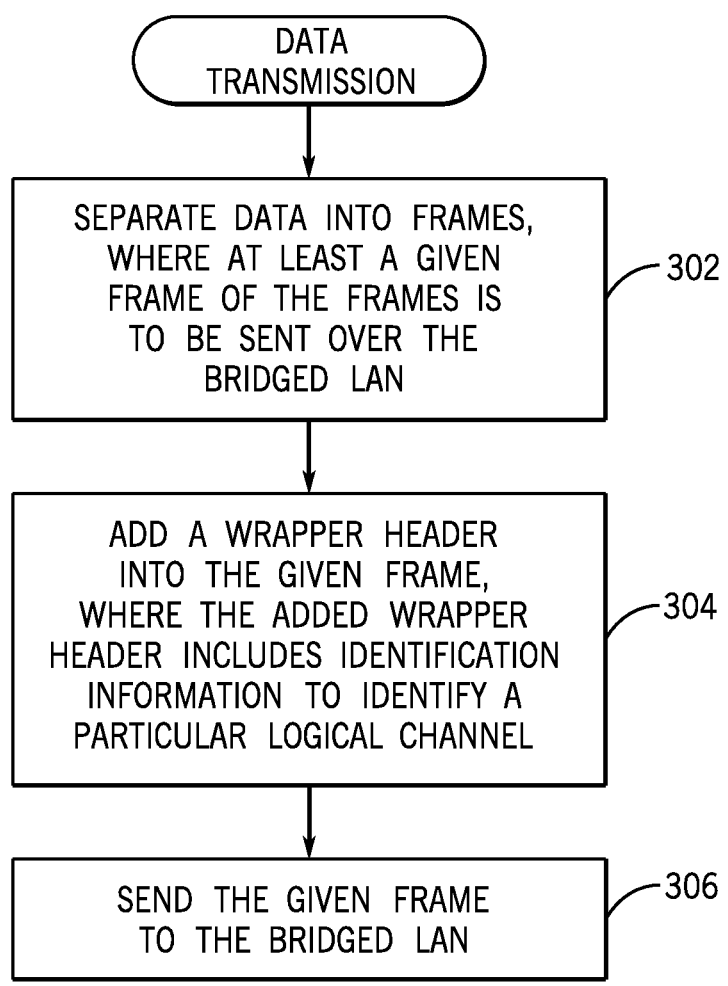
FIGS. 3 and 4 are flow diagrams of example data transmission and data reception processes, respectively, in accordance with some implementations.

FIG. 3 depicts an example process of data transmission, in which it is assumed that a transmitting device (either the mobile device 106 or the eNB 108) is transmitting the data over the bridged LAN to a receiving device (the other one of the mobile device 106 or the eNB 108). Transmission of data between the mobile device 106 and the eNB 108 over the cellular radio link 109 is not discussed in further detail. The data to be transmitted is associated with a particular logical channel of multiple logical channels in the transmitting device.

The transmitting device separates (at 302) the data into frames, where at least a given frame of the frames is to be transmitted over the bridged LAN. The remaining frames can be sent over the bridged LAN or over the cellular radio link 109.

The logical channel shim layer (220 or 256 in FIG. 2) adds (at 304) a wrapper header (also referred to as a "logical channel shim") into the given frame, where the added wrapper header includes identification information to identify the particular logical channel (or to identify the respective upper protocol layer instance).

The transmitting device then sends (at 306) the given frame to the bridged LAN over the WLAN radio link 111, for delivery to the receiving device.

Figure 4:
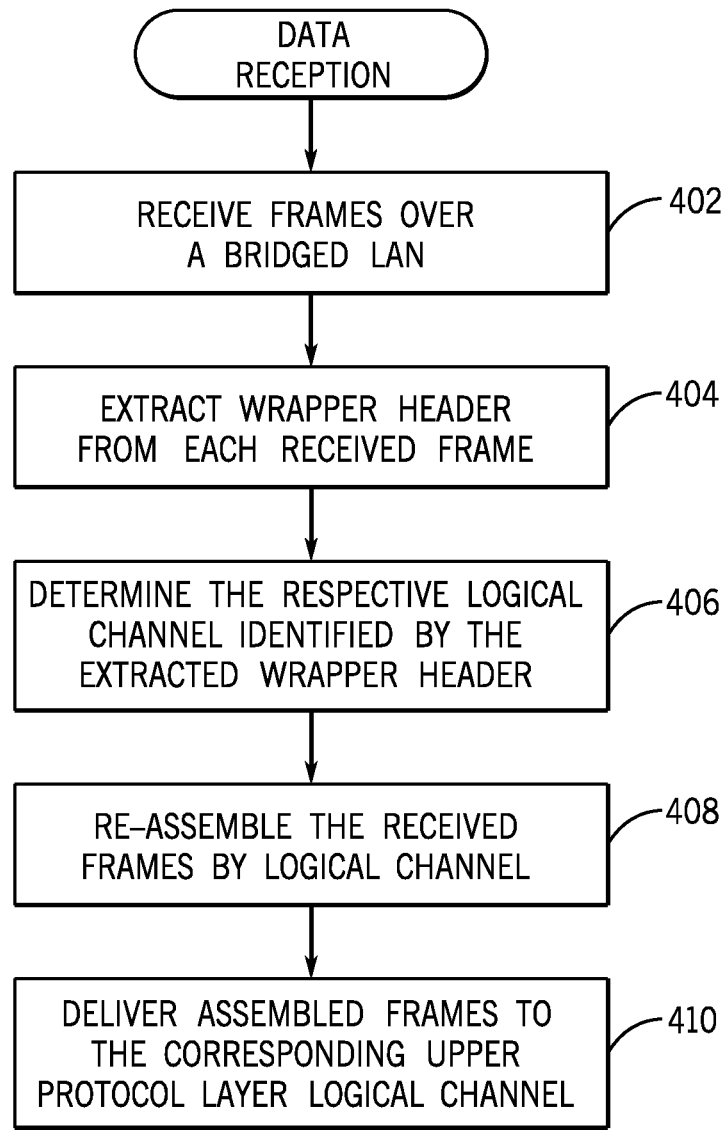

FIG. 4 depicts an example process of data reception, in which it is assumed that a receiving device (either the mobile device 106 or the eNB 108) has received data over the bridged LAN from a transmitting device (the other one of the mobile device 106 or the eNB 108).

The receiving device receives (at 402) frames over the bridged LAN. Each received frame can include a wrapper header that contains identification information identifying a respective logical channel that the received frame belongs to. The logical channel shim layer (220 or 256 in FIG. 2) extracts (at 404) the wrapper header from each received frame, and determines (at 406) the respective logical channel identified by the extracted wrapper header.

The receiving device then re-assembles (at 408) the received frames by logical channel. In other words, received frames belonging to a particular logical channel are assembled together and delivered (at 410) to the particular logical channel, such as to a queue of the particular logical channel. The received frames can be associated with multiple logical channels, in which case multiple sets of received frames are re-assembled for the respective logical channels. Note also that frames for the particular logical channel can be received both from the bridged LAN and the cellular radio link 109; in such case, the frames for the particular logical channel received from the bridged LAN and the cellular radio link 109 can be re-assembled and delivered to the particular logical channel.

In some examples, the wrapper header added by the logical channel shim layer can be a two-byte (16-bit or 2-octet) field, which can allow for provision of an upper protocol layer logical channel identifier that ranges in value between 0 and 65535. In other examples, the wrapper header can have a different length. If one of the bits of the two-byte field is reserved for a flag, then the logical channel identifier can range in value between 0 and 32767. If more bits of the two-byte field are reserved for a flag, then the logical channel identifier can have progressively smaller ranges of values.

In further examples, some logical channel identifier values may be reserved. For example, a logical channel identifier of 0 (or other specified value) can identify control channel information. The transmitting and receiving devices can negotiate or assign specific logical channel identifier values used on the bridged LAN. The transmitting and receiving devices can also negotiate or assign logical channel identifier values over the WLAN 104 using a control channel (such as a control channel identified with a logical channel identifier value of 0 in the wrapper header). In further examples, the assigned logical channel identifier values may be implicit (if for example the numerical order of the logical channels is already known by both transmitting and receiving devices).

In some implementations, a scheduler in the transmitting device can be used to decide whether to transmit a particular upper layer frame using the cellular RAT or the bridged RAT, based on one or more factors, such as current channel conditions (of the licensed spectrum and/or unlicensed spectrum), priority of the data being sent, type of data being sent (e.g. video, voice, backup data, etc.), and/or other factors.

Use of 802.1Q VLAN tags to identify VLANs allows for upper protocol layer traffic to be distinguished (by a VLAN) on a network, and more specifically, the bridged LAN. Using VLAN encoding allows a cellular network interface point, which can be referred to as a Trusted Wireless Access Gateway (TWAG) or uNodeB, to exist as an endpoint within the physical AP enclosure, or to exist elsewhere on a segment of a layer 2 network. The VLAN tags allow for transportation of both Internet Protocol (IP) and non-IP messages across a switched Ethernet network.

Figure 5A:
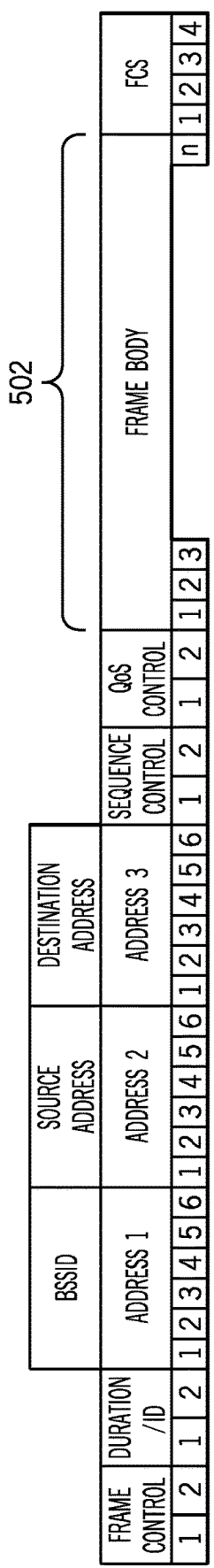
FIGS. 5A-5F are schematic diagrams illustrating formats of various example frames, according to some implementations.
Figure 5B:
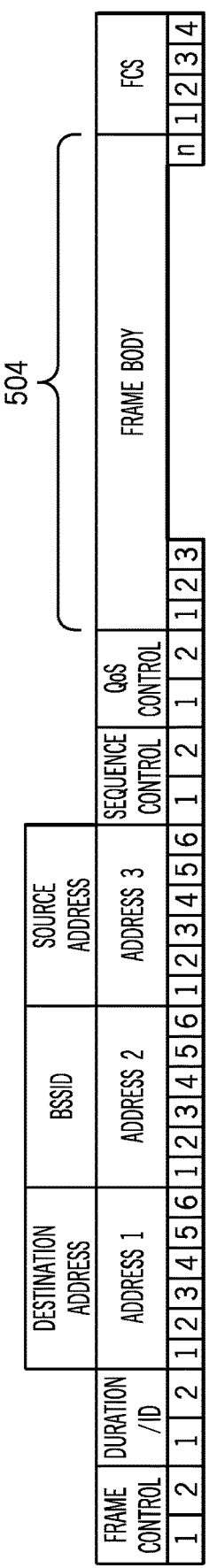

FIGS. 5A-5F illustrate example formats of various frames. FIG. 5A shows an uplink frame, and FIG. 5B shows a downlink frame, where each frame has a format according to IEEE 802.11. Each uplink frame or downlink frame includes a respective frame body 502 or 504. The numbers (e.g. 1, 2, 3, etc.) underneath each frame shown in FIGS. 5A-5F represent the respective bytes of each field.

The uplink frame of FIG. 5A includes a header that has three address fields: a first address field that stores a basic service set identifier (BSSID) of the wireless AP, a second address field that stores the source IEEE 802.11 MAC address of the mobile device 106 (the transmitting device), and a third address field that stores the destination IEEE 802.11 MAC address of the eNB 108 (the receiving device). A BSS includes zero or more non-AP STAs (such as mobile devices or other terminal devices) that are connected to the same wireless AP. The BSSID can be the MAC address of the wireless AP.

The downlink frame of FIG. 5B includes a header that has three address fields: a first address field that stores the destination IEEE 802.11 MAC address of the mobile device (the receiving device), a second address field that stores the BSSID of the wireless AP, and a third address field that stores the source IEEE 802.11 MAC address of the eNB 108 (the transmitting device).

The other control fields in uplink and downlink frames of FIGS. 5A-5B are according to IEEE 802.11.

Figure 5C:
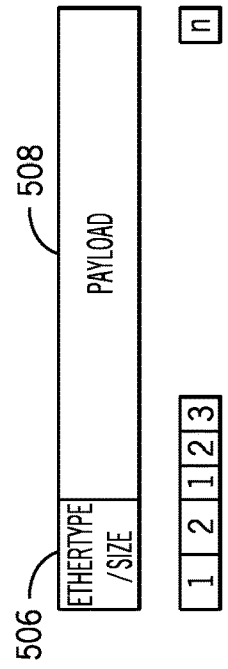

FIG. 5C shows an example of the information content of the frame body 502 or 504 in the respective uplink or downlink frame, where the information content can include a header 506 and a payload 508. The header 506 can include an EtherType field and a Size field, with the EtherType field identifying a protocol of the payload 508, and the Size field indicating a size of the payload 508.

Figure 5D:
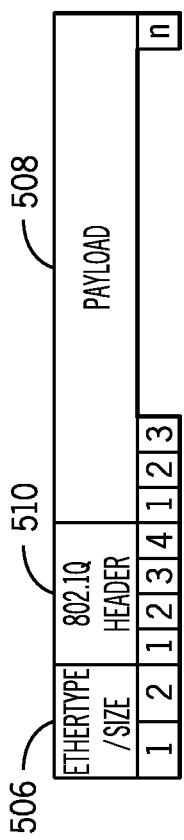
Figure 5E:
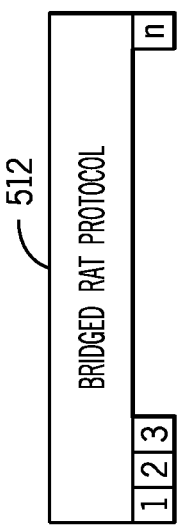
Figure 5F:
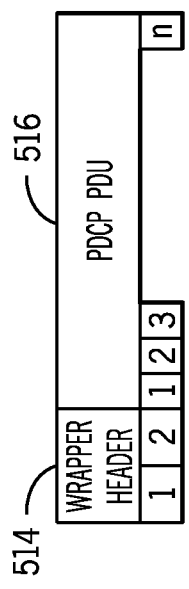

FIG. 5D shows an alternative example of the information content of the frame body 502 or 504 in the respective uplink or downlink frame, where an IEEE 802.1Q header 510 is added that includes a tag for identifying a VLAN. FIG. 5D shows an example of an IEEE 802.11 ak EPD encoded frame that can be carried in the frame body 502 or 504 of a respective uplink or downlink frame.

The payload 508 of the frame shown in FIG. 5D includes information content 512 according to the bridged RAT protocol. As noted above, the bridged RAT protocol refers to a protocol in which data between a mobile device and a cellular network is carried over a bridged LAN according to the present disclosure. The information content 512 according to the bridged RAT protocol includes a wrapper header 514 and bearer data 516, which can be a PDCP PDU or data of another upper protocol layer instance. The wrapper header 514 is provided by the logical channel shim layer 220 or 256 in the mobile device 106 or eNB 108, respectively.

TCIW Network Identification

The mobile device 106 of FIG. 1 or other STA may not know before associating with a wireless AP (e.g. wireless AP 110) whether the wireless AP supports data communication to a cellular network (e.g. cellular network 102). More specifically, the mobile device 106 or other STA may not know if a wireless AP supports a bridged LAN between the mobile device/STA and the cellular network.

In accordance with some implementations of the present disclosure, a mechanism is provided to distinguish a wireless AP (or the corresponding BSS) that supports bridged LAN communications (or more specifically, IEEE 802.11ak-based VLAN access) to a cellular network from an AP that does not support IEEE 802.11ak-based VLAN access to a cellular network. An AP that is capable of supporting bridged LAN access to a cellular network according to the present disclosure can be referred to as a 3GPP-TCIW-GLK-capable AP. Such an AP can be identified using capability information transmitted by the AP. This capability information is transmitted within the capability field or extended capabilities element.

Examples of capability information that can be advertised include one or more of the following:
  indication of support for 802.11ak;
  indication of support for EPD;
  identification of the 3GPP home network affiliated with the AP; and
  identification of the MAC address of the 3GPP radio access network component (more specifically the eNB or other cellular access network node).

In some implementations, the capability can be advertised with information carried in at least one of an IEEE 802.11 beacon transmitted by the AP, a vendor-specific element of an IEEE 802.11 probe response transmitted by a peer STA (e.g. an AP), a native element of an IEEE 802.11 probe response transmitted by a peer STA (e.g. an AP), an Access Network Query Protocol (ANQP) element transmitted by a peer STA (e.g. an AP), or any combination of the foregoing. Note that probe requests/responses and ANQP messages are symmetrical.

The identification of the 3GPP home network affiliated (tightly coupled) with the AP can include a mobile country code (MCC) and mobile network code (MNC), or alternatively, an identification of a realm that includes the MCC and MNC. This is also referred to as a Public Land Mobile Network (PLMN) identifier including the MCC and MNC.

The indication of support for 802.11 ak can include information indicating the capability for non-GLK connections, GLK connections, or simultaneous GLK and non-GLK connections.

Identification in a Beacon

The foregoing AP capability information can be advertised using a beacon, or more specifically, a beacon frame.

An AP is able to transmit beacon frames on a repeated basis, where each beacon frame contains information about a network and announces presence of a WLAN.

In some examples, two bits in a beacon transmitted by an AP can allow a STA to make a determination that the AP is able to support bridged LAN access to a cellular network. The two bits include an interworking bit and an 802.11ak bit (EPD capability bit). These two bits if set (to a logical "1" value, for example) indicate that the AP is capable of 802.11ak EPD operation, which allows the AP to provide bridged LAN access to a cellular network.

These two bits can be set in an extended capabilities element of a beacon frame, for example. The existing interworking bit if set indicates that the AP is capable of performing ANQP queries, and the 802.11ak bit if set indicates that the AP is capable of 802.11ak EPD operation. ANQP is a query and response protocol that allows devices to send queries to a peer device (e.g. an AP) to discover information (including the MAC address and other information) about that peer device (e.g. an AP) in responses to the queries.

More generally, the capability is advertised by transmitting a first indicator indicating support for interworking service (to indicate support for ANQP), and a second indicator indicating support for GLK capability (to indicate EPD support). An ANQP element (that is part of an ANQP response) can provide the address of the cellular access network node.

In another example, a single bit in a beacon transmitted by an AP can allow an STA to make a determination that the AP is able to support bridged LAN access to a cellular network. This bit can directly indicate a TCIW capability.

Identification in a Probe Response (Vendor-Specific Element)

The AP capability information discussed above can also be conveyed in a vendor-specific element of a probe response. A probe response is sent by an AP in response to a probe request. Probe requests and responses can be sent between any two STAs or a STA and AP. The example here involves an AP, but similar request-response sequences are also possible between peer STAs.

A device (e.g. mobile device 106 in FIG. 1) can send a probe request to discover 802.11 networks within the device's proximity. A probe request advertises the device's supported data rates and 802.11 capabilities.

If an AP that received the probe request is able to support the device based on the data rates/capabilities of the device, the AP can send a probe response advertising the service set identifier (SSID) of the AP, along with other information. In accordance with some implementations, the AP capability information relating to whether the AP supports bridged LAN access to a cellular network can also be included in the probe response, and more specifically, a vendor-specific element of the probe response.

A vendor-specific element can refer to an information element that is added to the probe response for a respective entity (e.g. 3GPP). Note that the vendor-specific element for Bridged LAN support being present in the probe response is itself an indicator that the AP supports bridged LAN access to a cellular network. In addition, other information such as those described in the section relating to "Identification in an ANQP Response" can also be included in the vendor-specific element of the probe response.

An example format of the vendor-specific element of the probe response is provided below. Although specific fields and respective lengths are specified below, it is noted that alternative or additional fields or different lengths can be used in other examples.

|  | Element ID | Length | OI | Type | Configuration | PLMN List |
|---|---|---|---|---|---|---|
| Octets: | 1 | 1 | 3 | 1 | 1 | 0-250 |

The Element ID field is a 1-octet field whose value is the value for vendor-specific information elements (e.g. value 221). The Length field can be set to the length of this vendor-specific element. The OI (Organization Identifier) field is a 3-octet field and can be set to an Organizationally Unique identifier (OUI) (e.g. the value assigned to 3GPP). The Type field corresponds to a value describing the protocol that is used. For example, this can be a number that the vendor (e.g. 3GPP) assigns to its own protocols and leaves open the possibility for additional protocols or future protocol revisions. The Configuration field corresponds to a bitmap of configuration parameters, where the configuration parameters can specify support for downlink-only, uplink and downlink, etc. The PLMN List field is an optional field that contains one or more home network identifiers (e.g. public land mobile networks or PLMNs) associated with the cellular network.

A STA (e.g. mobile device 106) receiving the vendor-specific element in a probe response that indicates support for bridged LAN access to a cellular network can use ANQP messages described below in the section relating to "Identification in an ANQP Response" to further query the network for more detailed information of a peer STA (e.g. an AP).

Identification in a Probe Response (802.11 Native Element)

The foregoing section describes the use of a vendor-specific element of a probe response to carry information indicating support by an AP for bridged LAN access to a cellular network. In further implementations, the same information can be carried in an 802.11 native element of a probe response, where an 802.11 native element refers to an information element standardized by the IEEE 802.11 standards. This native element can be standardized in future versions of the IEEE 802.11 standards.

This native element being present in a probe response is itself an indicator that the AP supports bridged LAN access to a cellular network. In addition, other information such as those described in the section relating to "Identification in an ANQP Response" can also be included in the vendor-specific element of the probe response.

An example format of the native element of the probe response is provided below. Although specific fields and respective lengths are specified below, it is noted that alternative or additional fields or different lengths can be used in other examples.

|  | Element ID | Length | Configuration | PLMN List |
|---|---|---|---|---|
| Octets: | 1 | 1 | 1 | 0-254 |

The Element ID field is a 1-octet field whose value is the value for Bridged RAT identification as assigned by the IEEE 802.11 assigned numbers authority (ANA). The Configuration field corresponds to a bitmap of configuration parameters such as downlink-only, uplink and downlink, and so forth. The PLMN List field is an optional field which contains one or more home network identifiers (e.g. PLMNs) associated with the cellular network.

A STA (e.g. mobile device 106) receiving the native element in a probe response may use the ANQP messages in the section below to further query the network for more detailed information of a peer STA (e.g. an AP).

Identification in ANQP Response (802.11 Native Element)

The ANQP protocol allows a STA (e.g. mobile device 106) to query a peer STA (e.g. an AP) for additional information in a pre-associated state. In this case the STA can use existing ANQP-elements such as Network Access Identifier (NAI) Realm, 3GPP Cellular Network, Operator Friendly Name, and Roaming Consortium to determine if the WLAN (e.g. WLAN 104) is associated with a 3GPP radio access network (home or roaming).

In accordance with some implementations of the present disclosure, two new information elements are available to a STA via ANQP. The first information element is used to determine if the network is capable of bridged LAN access to a cellular network. The second information element is used to convey the MAC address of a server to which traffic is to be addressed.

To provide the first information element, the existing 3GPP Cellular Network ANQP element can be extended. The 3GPP Cellular Network ANQP element is extended beyond the two possible lists encoded in the 3GPP Cellular Network ANQP element pursuant to 3GPP TS 24.302 Annex H.

In addition to 00000000 PLMN List and 00000001 PLMN List with S2a connectivity, the 3GPP Cellular Network ANQP element can also include 000000nn (where nn can represent any specified value). PLMN List with Bridged RAT connectivity (where Bridged RAT connectivity refers to bridged LAN access to a cellular network). Multiple PLMNs are possible to allow for shared radio access networks. Multiple PLMNs can also allow for small cell site sharing possibilities based on WLAN technology.

An example of the extended 3GPP Cellular Network ANQP element is provided below.

| 00000000 | PLMN List |
| 00000001 | PLMN List with S2a connectivity |
| 000000nn | PLMN List with Bridged RAT connectivity |

The following section provides a proposed update to the IEEE 802.11 standards to implement this feature.

"8.4.4.x Gateway address ANQP-element"

The gateway address ANQP-element provides a destination address of a server which can be used as the destination address for frames intended for an external network (e.g. a 3GPP core network, such as 112 in FIG. 1). A peer STA (e.g. an AP) can provide either a direct connection to this server, or an 802.1Q VLAN/Bridge address. In the latter case the peer STA (e.g. an AP) can tag the EPD encoded frames with bridging tags sufficient to pass the frame through the backhaul network to the gateway server. This gateway server unpacks the EPD encoded 3GPP RLC/PDCP frame and passes the frame into the 3GPP RAN.

Figure 8:
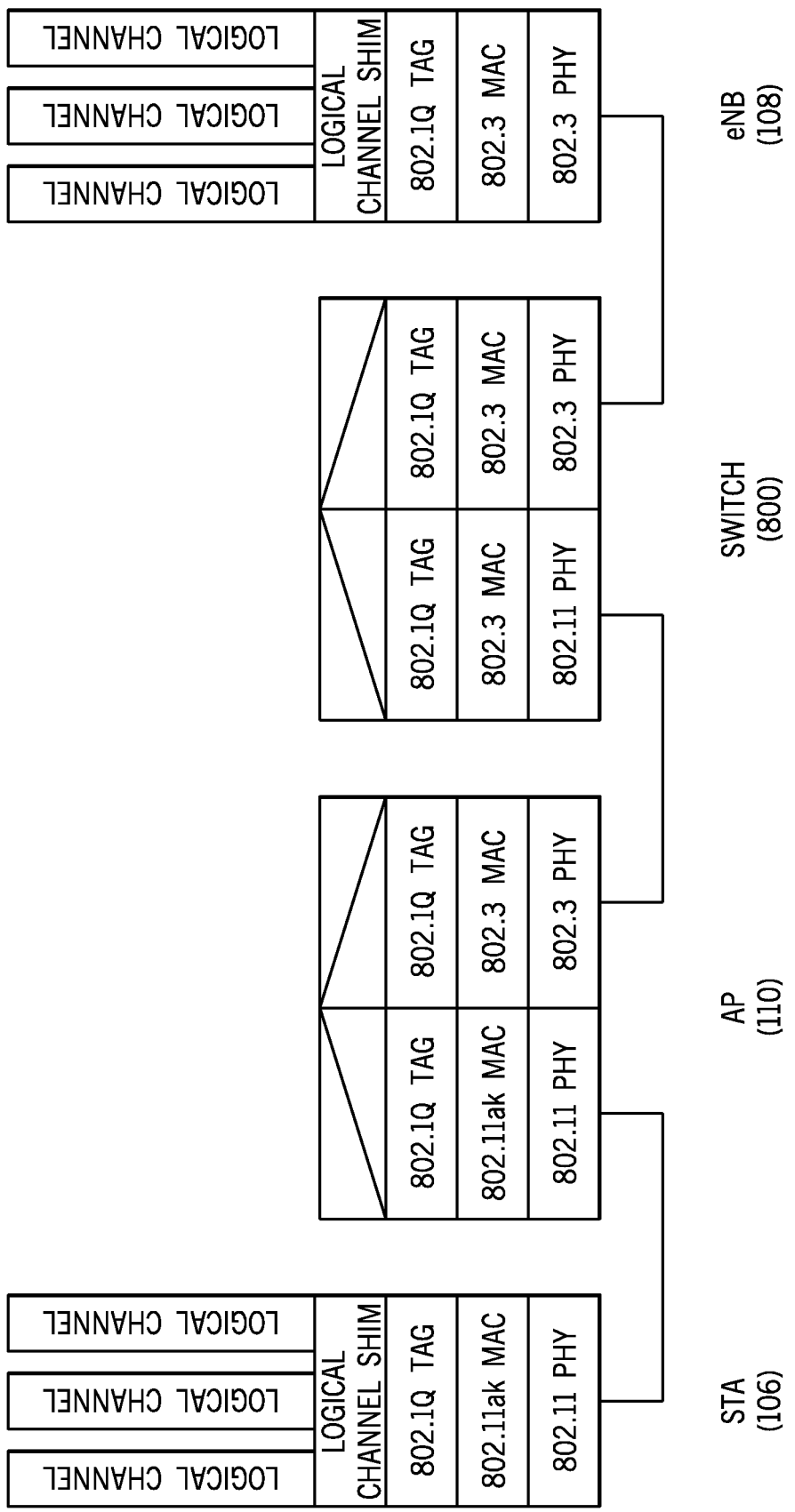
FIG. 8 is a schematic diagram showing various example protocol layers in a device, a wireless access point, a switch, and a cellular access network node, according to some implementations.

The format of the gateway address ANQP-element is defined in FIG. 8-404ak

|  | Info ID | Length | gateway address |
|---|---|---|---|
| Octets: | 2 | 2 | variable |

The Info ID field is equal to the next available value in Table 8-258 (ANQP-element definitions) corresponding to a gateway address ANQP-element, which is to be added to that table.

The Length field is a 2-octet field whose value is set to the length of the gateway address field. It is possible that the Length field is omitted as the gateway address is a fixed length and only one address may be present.

The gateway address field is a variable-length field used to indicate the gateway address, to which frames can be addressed (e.g. a 3GPP Server MAC address).

Architecture of a Device

Figure 6:
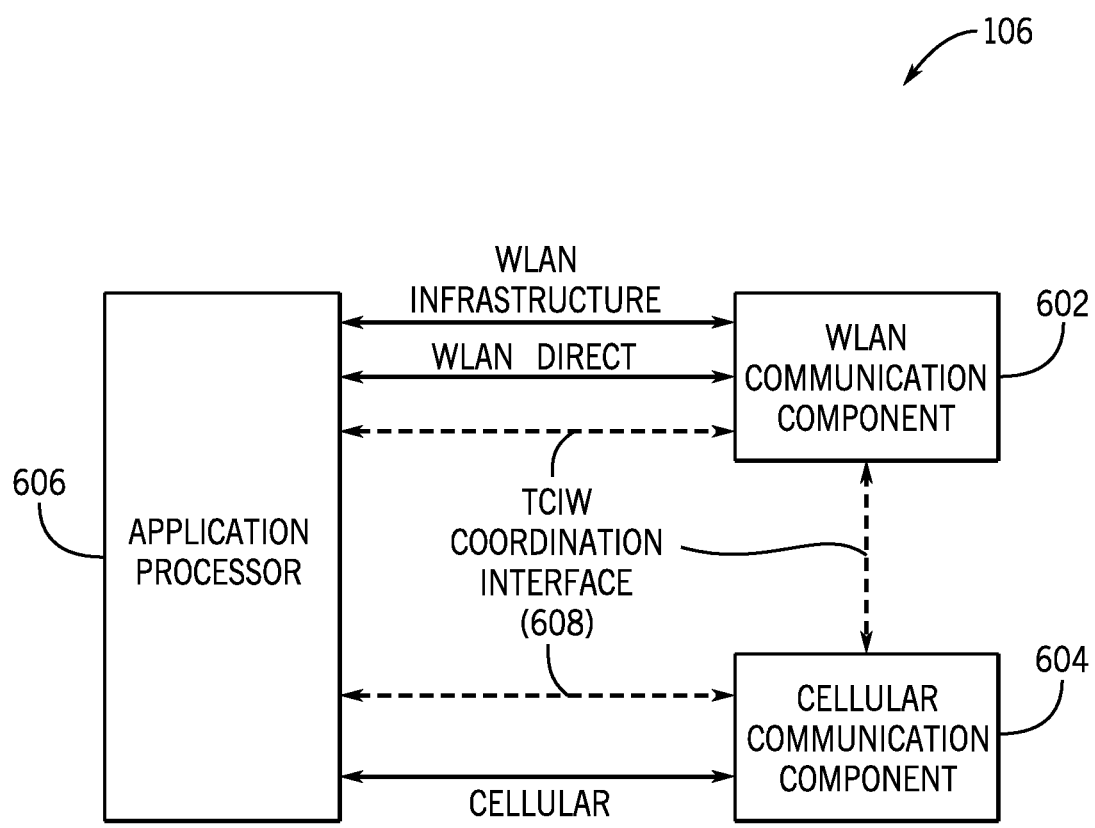
FIG. 6 is a block diagram of an example architecture of a device, according to some implementations.

FIG. 6 shows components of the mobile device 106, according to some implementations. The mobile device 106 includes a WLAN communication component 602 and a cellular communication component 604 to allow the mobile device to perform both cellular and WLAN communications. The WLAN communication component 602 allows the mobile device 106 to communicate over the WLAN radio link 111, and the cellular communication component 604 allows the mobile device 106 to communicate over the cellular radio link 109.

Each of the communication components 602 and 604 can be implemented as a module to allow the mobile device to communicate over a respective radio link. Note that the communication components 602 and 604 can be subsystems integrated onto a single chip or independent chips connected via a communication bus, in some examples. In other examples, the communication components 602 and 604 can be implemented as software modules.

The WLAN communication component 602 supports three virtual interfaces: a first virtual interface for infrastructure WLAN communications (the mobile device 106 communicating with an AP of the network infrastructure), a second virtual interface for WLAN direct communications (the mobile device 106 can communicate wirelessly with another non-AP STA), and a third virtual interface for TCIW communications (communications between the mobile device 106 and a cellular network using bridged LAN as discussed above). There can also be other virtual interfaces for whitespace radios, intelligent transport systems, neighbour aware networks, or networks in other frequency bands.

FIG. 6 also shows a TCIW interface and a cellular interface supported by the cellular communication component 604.

The three virtual interfaces of the WLAN communication component 602 can be exposed by an operating system and device drivers of the mobile device 102 to software and applications as appropriate. The TCIW interface may be under exclusive control of the LTE host software, for example. The three virtual interfaces in the WLAN component 602 can be implemented as a single chip with, for example, fast switching capabilities. Alternatively, the three virtual interfaces can be implemented as independent hardware that enables concurrency.

In some implementations, the WLAN component 602 can implement PDCP and RLC layers. In this case, frames can pass directly to an application processor 606 without going through the cellular communication component 604. The application processor 606 can be a general-purpose processor of the mobile device 106 to execute machine-readable instructions of the mobile device 106, for example. Implementing PDCP and RLC layers in the WLAN communication component 602 can result in less coordination between the WLAN communication component 602 and the cellular communication component 604.

In other implementations, the WLAN component 602 does not implement the cellular upper layers (e.g. PDCP or RLC layers). In this case, a direct or indirect TCIW coordination interface 608 is used to send the upper layer data from the WLAN communication component 602, which is received at the cellular communication component 604 where the received upper layer data will be processed. For the transmitting direction the upper layer protocol frames (e.g. PDCP, RLC) can be processed in the cellular communication component 604 and sent via the TCIW Coordination Interface 608 to the WLAN communication component 602 for transmission over the WLAN radio link.

In FIG. 6, TCIW traffic (traffic between the mobile device 106 and a cellular network using the bridged LAN) can be routed through the application processor 606 and can be combined with Wi-Fi Direct and/or Wi-Fi infrastructure traffic over a link between the application processor 606 and the WLAN component 602. Alternatively the TCIW traffic could be routed directly from the cellular component 604 and the WLAN component over a dedicated link. Examples of links from the application processor 606 to the WLAN component 602 and from the cellular component 604 to the WLAN component 602 can include any of the following: Serial Digital Input Output (SDIO) link; a shared memory; a High Speed Inter Chip (HSIC) link; a Peripheral Component Interconnect express (PCIe) link; and so forth.

Some WLAN components are capable of simultaneous connections or associations in the same or different bands. For example, a simultaneous dual band capable WLAN component enables the mobile device 106 to perform Wi-Fi Direct communications in the 2.4 GHz band and Wi-Fi infrastructure communications or TCIW communications in the 5 GHz band.

Architecture of a Network Arrangement

An arrangement that includes an eNB and an AP that support TCIW communications can be designed to only allow 3GPP TCIW connectivity or to also allow non-11ak WLAN connectivity. 3GPP TCIW connectivity refers to connectivity where communications between a device and a cellular network can occur through a bridged LAN including a WLAN AP and a backhaul link, as discussed above. Non-11ak WLAN connectivity refers to connectivity where a device connects to a WLAN AP can communicates with another device through the WLAN AP.

Figure 7:
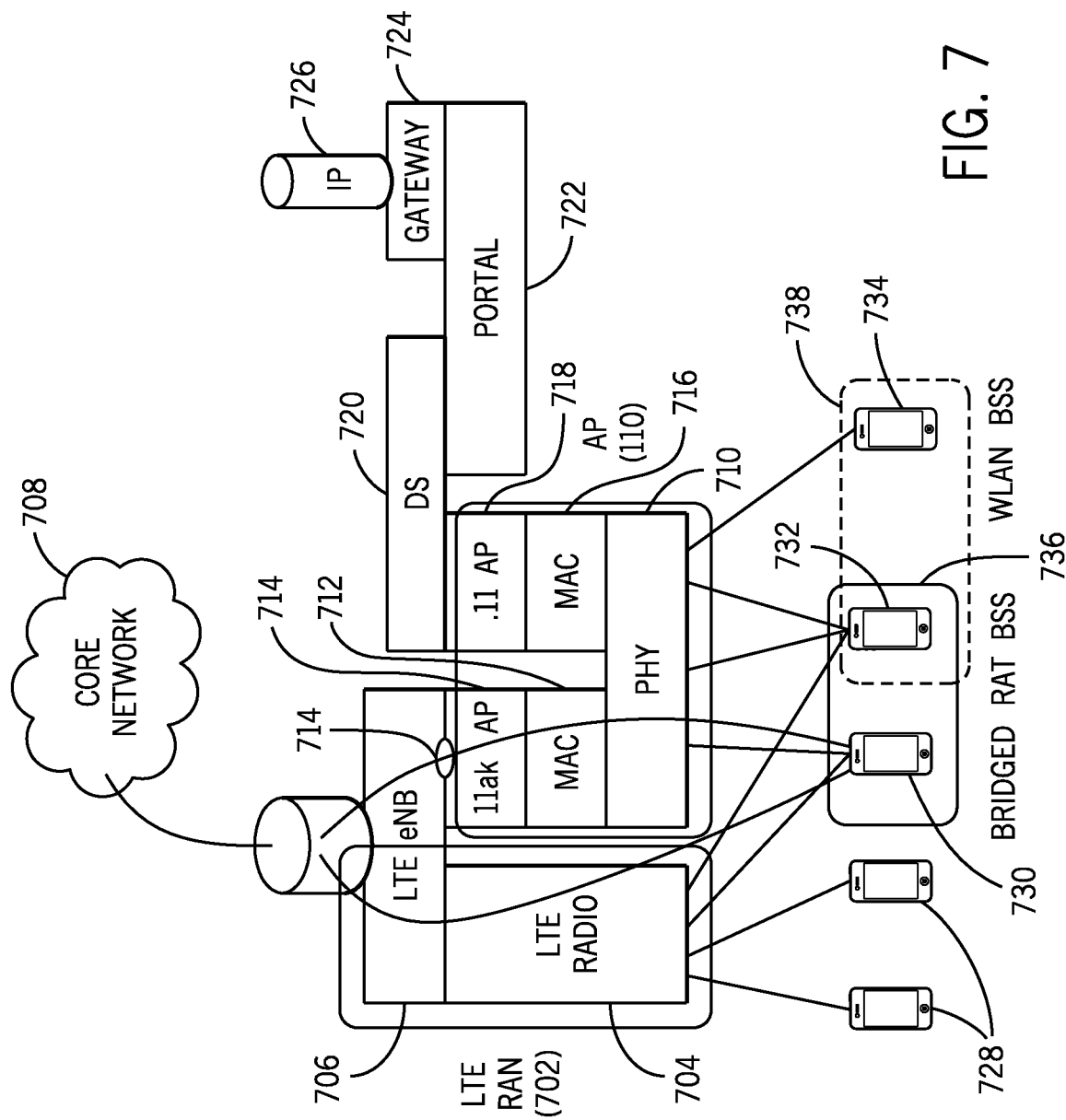
FIG. 7 is a schematic diagram illustrating components of an example network arrangement including a radio access network and a wireless access point, according to further implementations.

FIG. 7 shows an example arrangement that includes an LTE radio access network (RAN) 702, which includes an LTE radio 704 and an LTE eNB 706. The LTE eNB 706 can communicate with a core network 708.

In the example of FIG. 7, it is assumed that the AP 110 is capable of supporting both 3GPP TCIW connectivity and WLAN connectivity. The 3GPP TCIW connectivity is provided through a physical layer 710, a MAC layer 712, an IEEE 802.11ak layer 714, and an interface 714 between the 802.11ak layer 714 and the LTE eNB 706. The interface 714 includes an EPD encoded 802.1Q tagged VLAN, which can be implemented as an IEEE 802.3 Ethernet network or other network. Note that due to the nature of 802.11 Q tagging and tag stacking, this can extend across several physical network segments.

WLAN connectivity is provided through the physical layer 710, a MAC layer 716, and an IEEE 802.11 AP logical component 718. The IEEE 802.11 AP logical component 718 is connected to a distribution system (DS) 720. To connect to an external network the DS 720 is connected to a portal 722, which in turn connects to a gateway 724 that interconnects to an IP network 726. The IP network 726 can be the Internet or a local LAN, as examples.

FIG. 7 shows several example devices that are able to communicate using the network arrangement shown in FIG. 7. Devices 728 perform communications with just the cellular network. Devices 730 and 732 are able to perform TCIW communications, and are part of a bridged RAT BSS 736. Devices 732 and 734 are able to communicate over the WLAN, such as to the IP network 726, and are part of a WLAN BSS 738.

The devices 730 and 732 are GLK STAs, which can transmit non-IP traffic (e.g. 3GPP RLC, PDCP, or other upper layer frames) using 802.1Q VLAN tags through the AP 110 to the RAN 702 (LTE eNB 706). The device 734 is a non-GLK STA. Note also that the device 732 is capable of operating as either a GLK STA or non-GLK STA. The non-GLK STAs connect to the same AP 110 using a non-GLK association and can transmit IP traffic. This IP traffic can be routed to the core network 708, such as through an LTE evolved packet data gateway (ePDG) or through an LTE S2b interface (not shown), or can be routed to the IP network 726 via the gateway 724. Note that the device 732 is an STA that is capable of simultaneously associating with both GLK and non-GLK networks (using different MAC addresses). This may involve communication to the same or different APs. Device 732 can route respective traffic over each network as described by the interfaces in FIG. 6.

FIG. 8 shows protocol layers in various nodes to support TCIW communications. The protocol layers shown in FIG. 8 are similar to those depicted in FIG. 2, except that the protocol layers of a switch 800 (which is part of the backhaul link 114 of FIG. 1) are also shown. The AP 110 protocol layers represent the WLAN infrastructure and the switch 800 protocol layers represent the wired Ethernet infrastructure (essentially the core network attached to the WLAN 104). The use of 802.1Q tagging allows the payloads (containing data of upper protocol layers) to be carried across the 802.3 infrastructure.

Note that the 802.11ak-based TCIW network according to the present disclosure is an integrated part of the 3GPP RAN, and is not a "non-3GPP access" network.

Use of 802.11ak to implement the bridged LAN access to a cellular network as discussed can allow for a more flexible system design, as EPD encoding is well defined and allows for seamless transport across an existing IEEE 802.11 MAC/PHY architecture. As a result, the reuse of parts of the 802.11 protocol stack that are incompatible with existing deployments can be avoided. Data of the upper layer protocol layers in the device and cellular access network node are seamless (transparent) to the AP 110 and the WLAN core network, which allows data transport across standard 802.3-based wired switches to the cellular network.

The bridged LAN access to a cellular network as discussed in the present disclosure can be flexibly adapted to evolving technologies, including 4G and 5G technologies and beyond.

System Architecture

Figure 9:
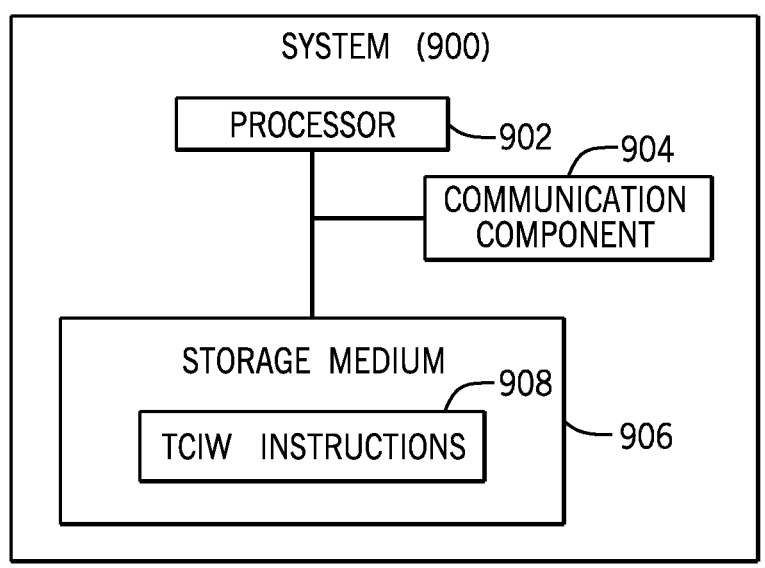
FIG. 9 is a block diagram of an example system according to some implementations.

FIG. 9 is a block diagram of an example system 900, which can represent any one of: a device (e.g. mobile device 106), AP (e.g. AP 110), or cellular access network node (e.g. 108). The system 900 can be implemented as a computing device or an arrangement of multiple computing devices.

The system 900 includes a processor (or multiple processors) 902, which can be coupled to a communication component including a communication transceiver (or multiple communication components including communication transceivers) 904 to communicate with another entity, either wirelessly or over a wired link. A processor can include a microprocessor, a microcontroller, a physical processor module or subsystem, a programmable integrated circuit, a programmable gate array, or another physical control or computing circuit.

The processor(s) 902 can also be coupled to a non-transitory machine-readable or computer-readable storage medium (or storage media) 906, which can store TCIW machine-readable instructions 908 that are executable on the processor(s) 902 to perform various tasks as discussed above.

The storage medium (or storage media) 906 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
communicating, by a bridge, a link layer frame between a device and a cellular access network node, the link layer frame comprising a portion including a header and data of an upper layer protocol layer instance in the device or the cellular access network node, the header including identification information to identify which of a plurality of upper layer protocol layer instances the data is associated with, wherein the portion of the link layer frame comprising the header and the data is a payload of an Ethertype Protocol Discrimination (EPD) encoded frame; and
advertising, by the bridge, a capability to perform bridged access to a cellular network comprising the cellular access network node, the bridged access allowing communication between devices and cellular network access nodes of the cellular network through the bridge, the advertising comprising setting, in a first message, an EPD capability indicator to a first value indicating support for an EPD operation, and an interworking indicator to a second value indicating support for an interworking service, the EPD capability indicator and the interworking indicator both included in the first message, and the EPD capability indicator set to the first value in the first message and the interworking indicator set to the second value in the first message together advertising the capability of the bridge to perform bridged access from the device to the cellular network through the bridge and a bridged local area network,
wherein the first message including the EPD capability indicator and the interworking indicator is one of an IEEE 802.11 beacon transmitted by the bridge, an IEEE 802.11 probe response transmitted by the bridge in response to a probe request from the device, or an Access Network Query Protocol (ANQP) response transmitted by the bridge in response to an ANQP request from the device.

2. The method of claim 1, wherein communicating the link layer frame comprises communicating the link layer frame that is according to an Institute of Electrical and Electronics Engineers (IEEE) 802.11 protocol.

3. The method of claim 1, wherein the cellular access network node comprises a Long-Term Evolution (LTE) evolved Node B.

4. The method of claim 1, wherein the cellular access network node comprises a gateway to the cellular network.

5. The method of claim 1, wherein the plurality of upper layer protocol layer instances comprise a plurality of Packet Data Convergence Protocol (PDCP) layer instances, wherein each instance of the plurality of PDCP layer instances is identified by a respective different identifier, and wherein the identification information in the header in the portion of the link layer frame includes an identifier of one of the plurality of PDCP layer instances.

6. The method of claim 1, wherein the link layer frame includes a tag to identify a virtual local area network (VLAN).

7. The method of claim 1, wherein the link layer frame is part of bearer data communicated between the device and the cellular access network node, wherein a first portion of the bearer data is communicated through the bridge, and a second portion of the bearer data is wirelessly communicated directly between the device and the cellular access network node.

8. The method of claim 7, wherein the second portion of the bearer data uses a licensed spectrum to communicate with the cellular access network node, and the first portion uses an unlicensed spectrum to communicate with the cellular access network node.

9. The method of claim 1, wherein the plurality of upper layer protocol layer instances comprise a plurality of Radio Link Control (RLC) layer instances, wherein each instance of the plurality of RLC layer instances is identified by a respective different identifier, and wherein the identification information in the header in the portion of the link layer frame includes an identifier of one of the plurality of RLC layer instances.

10. A wireless access point comprising:
a first communication interface to communicate with a device;
a second communication interface to communicate with a cellular access network node; and
at least one processor configured to:
communicate a link layer frame between the device and the cellular access network node, the link layer frame comprising a portion including a header and data of an upper layer protocol layer instance in the device or the cellular access network node, the header including identification information to identify which of a plurality of upper layer protocol layer instances in the device or the cellular access network node the data is associated with, wherein the portion of the link layer frame comprising the header and the data is a payload of an Ethertype Protocol Discrimination (EPD) encoded frame, and transmit capability information in a message, the message comprising an EPD capability indicator set to a first value and an interworking indicator set to a second value, the EPD capability indicator set to the first value and the interworking indicator set to the second value together specifying an ability of the wireless access point to perform bridged access between the device and a cellular network including the cellular access network node, the bridged access allowing communication between devices and cellular network access nodes of the cellular network through the wireless access point that behaves as a bridge, wherein the message including the EPD capability indicator and the interworking indicator is one of an IEEE 802.11 beacon transmitted by the wireless access point, an IEEE 802.11 probe response transmitted by the wireless access point in response to a probe request from the device, or an Access Network Query Protocol (ANQP) response transmitted by the wireless access point in response to an ANQP request from the device.

11. A device comprising:

a plurality of upper protocol layer instances; and a first communication transceiver to communicate with a wireless access point that provides access to a bridged local area network between the device and a cellular access network node, the first communication transceiver to transmit to the wireless access point a link layer frame that comprises a portion including a header and data associated with an upper protocol layer instance, the header including an identifier of an upper protocol layer instance, the identifier to identify which of a plurality of upper protocol layer instances the data is associated with, the link layer frame to pass through the wireless access point to the cellular access network node, wherein the portion of the link layer frame comprising the header and the data is a payload of an Ethertype Protocol Discrimination (EPD) encoded frame, wherein the first communication transceiver is to receive a message transmitted by the wireless access point, the message comprising an EPD capability indicator set to a first value indicating support for an EPD operation, and an interworking indicator set to a second value indicating support for an interworking service; and at least one processor configured to determine that the wireless access point supports bridged access to a cellular network including the cellular access network node through the wireless access point and the bridged local area network based on both the EPD capability indicator set to the first value in the message and the interworking indicator set to the second value in the message, wherein the message comprising the EPD capability indicator and the interworking indicator advertising a capability of the wireless access point to support the bridged access to the cellular network is one of:

a beacon transmitted by the wireless access point;

a probe response sent by the wireless access point in response to a probe request from the device; and an Access Network Query Protocol (ANQP) response sent by the wireless access point in response to an ANQP request from the device.

12. The device of claim 11, further comprising a second communication transceiver to communicate wirelessly with the cellular access network node.

13. The device of claim 11, further comprising a plurality of virtual interfaces, a first of the plurality of virtual interfaces for use to perform bridged communication with the cellular access network node through the wireless access point, and a second of the plurality of virtual interfaces for use to perform Institute of Electrical and Electronics Engineers (IEEE) 802.11 communications with the wireless access point or another device.

14. The device of claim 11, wherein the device is to associate with the wireless access point using a General Link (GLK) association.

15. The device of claim 14, wherein the link layer frame includes an IEEE 802.1Q tag to identify a virtual local area network (VLAN).

16. The device of claim 11, wherein the plurality of upper protocol layer instances comprise a plurality of Packet Data Convergence Protocol (PDCP) layer instances each identified by a respective different identifier, and wherein the identifier in the header in the portion of the link layer frame includes an identifier of one of the plurality of PDCP layer instances.

17. The device of claim 11, wherein the first value is a logical "1" value, and the second value is a logical "1" value.

* * * * *